(12) United States Patent
Hayashi et al.

(10) Patent No.: US 7,607,806 B2
(45) Date of Patent: Oct. 27, 2009

(54) VEHICLE LAMP

(75) Inventors: Masateru Hayashi, Isehara (JP); Yasuhiro Okubo, Isehara (JP); Shoichi Minokawa, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 184 days.

(21) Appl. No.: 11/542,192

(22) Filed: Oct. 4, 2006

(65) Prior Publication Data

US 2007/0076420 A1    Apr. 5, 2007

(30) Foreign Application Priority Data

Oct. 5, 2005    (JP) .............................. 2005-292363

(51) Int. Cl.
  *F21S 8/00*    (2006.01)
(52) U.S. Cl. ...................... 362/427; 362/545; 362/250; 362/528; 174/16.3
(58) Field of Classification Search ........................ None
See application file for complete search history.

(56) References Cited

U.S. PATENT DOCUMENTS

| | | | |
|---|---|---|---|
| 6,877,875 B2 * | 4/2005 | Yu et al. ...................... | 362/105 |
| 6,966,675 B2 | 11/2005 | Albou | |
| 7,371,964 B2 * | 5/2008 | Albou et al. ............... | 174/16.3 |
| 2002/0163816 A1 * | 11/2002 | Hayami ...................... | 362/487 |
| 2004/0130907 A1 | 7/2004 | Albou | |
| 2004/0202007 A1 * | 10/2004 | Yagi et al. .................... | 362/545 |
| 2005/0047169 A1 * | 3/2005 | Brandenburg et al. ....... | 362/545 |
| 2005/0094411 A1 | 5/2005 | Ishida et al. | |
| 2005/0105301 A1 * | 5/2005 | Takeda et al. ............... | 362/545 |
| 2005/0180157 A1 * | 8/2005 | Watanabe et al. ........... | 362/543 |
| 2006/0044802 A1 * | 3/2006 | Tiesler et al. ............... | 362/287 |
| 2007/0009210 A1 * | 1/2007 | Hulse ......................... | 385/88 |

FOREIGN PATENT DOCUMENTS

| | | |
|---|---|---|
| EP | 1 283 390 A2 | 2/2003 |
| EP | 1 434 002 A1 | 6/2004 |
| FR | 2 797 678 A1 | 2/2001 |
| FR | 2 861 834 A1 | 5/2005 |
| JP | 59-031707 U | 2/1984 |
| JP | 2002-93206 A | 3/2002 |
| JP | 2002-160581 A | 6/2002 |
| JP | 2004-207235 A | 7/2004 |
| JP | 2005-141918 A | 6/2005 |
| JP | 2005-209536 A | 8/2005 |

* cited by examiner

*Primary Examiner*—Sandra L O'Shea
*Assistant Examiner*—Danielle Allen
(74) *Attorney, Agent, or Firm*—Foley & Lardner LLP

(57) ABSTRACT

A semiconductor light source emits a light. The semiconductor light source is directly mounted on a heat sink unit. A swivel unit swivels the semiconductor light source and the heat sink unit. A swivel shaft that is coupled to the swivel unit is integrated with the heat sink unit.

9 Claims, 13 Drawing Sheets

VEHICLE LAMP

CROSS-REFERENCE TO RELATED APPLICATIONS

The present document incorporates by reference the entire contents of Japanese priority document, 2005-292363 filed in Japan on Oct. 5, 2005.

BACKGROUND OF THE INVENTION

1. Field of the Invention

The present invention relates to a vehicle lamp using a semiconductor light source, for example, a self-luminous semiconductor light source such as a light emitting diode (LED) or electroluminescent (EL), namely, an organic EL. More particularly, the invention relates to a vehicle lamp utilizing a semiconductor light source as a light source where an irradiation direction of light can be swiveled, the number of parts can be reduced, a manufacturing cost can be decreased, and excellent radiation effect can be achieved.

2. Description of the Related Art

Conventionally, there has been a type of a vehicle lamp, which utilizes a semiconductor light source as a light source. For example, Japanese Patent Application Laid-open No. 2002-93206 discloses this type of vehicle lamp. The conventional vehicle lamp is explained below. The conventional vehicle lamp is structured such that a board holding an LED is fixed on a radiation fin via an insulating heat conductive sheet. Since the conventional lamp is structured such that the LED is fixed on the radiation fin via the board and the insulating heat conductive sheet, heat generated in the LED can be radiated through the radiation fin efficiently. Therefore, an LED with high wattage that outputs high beam amount can be used in the conventional vehicle lamp.

In the conventional vehicle lamp, however, an irradiation direction of light from the LED cannot be swiveled. Whereas some of bulb type vehicle lamps in which a bulb, other than a LED, is used as a light source are structured to swivel an irradiation direction of light from the bulb.

As described above, conventional vehicle lamps have a problem that an irradiation direction of light from an LED cannot be swiveled.

SUMMARY OF THE INVENTION

It is an object of the present invention to at least partially solve the problems in the conventional technology.

A vehicle lamp according to one aspect of the present invention includes a semiconductor light source that emits a light; a heat sink unit on which the semiconductor light source is directly mounted; and a swivel unit that swivels the semiconductor light source and the heat sink unit. A swivel shaft that is coupled to the swivel unit is integrated with the heat sink unit.

A vehicle lamp according to another aspect of the present invention includes a lamp housing and a lamp lens that define a lamp chamber, and a swivel lamp unit disposed in the lamp chamber. The swivel lamp unit includes a semiconductor light source that emits a light; a heat sink unit on which the semiconductor light source is directly mounted; and a swivel unit that swivels the semiconductor light source and the heat sink unit. A swivel shaft that is coupled to the swivel unit is integrated with the heat sink unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Two embodiments among exemplary embodiments of a vehicle lamp according to the present invention will be explained below in detail with reference to the accompanying drawings. In the two embodiments, an example where a vehicle lamp of the present invention is used for a swivel lamp unit, and an example where the vehicle lamp of the present invention is used for a front combination lamp including the swivel lamp unit will be explained. The present invention is not limited to the embodiments. Terms "up", "down", "front (front face)", "back (rear face)", "left", and "right" used in this specification and appended claims indicate "up", "down", "front (front face)", "back (rear face)", "left", and "right" in a state that the vehicle lamp according to the present invention is mounted on a vehicle.

Figure 1:
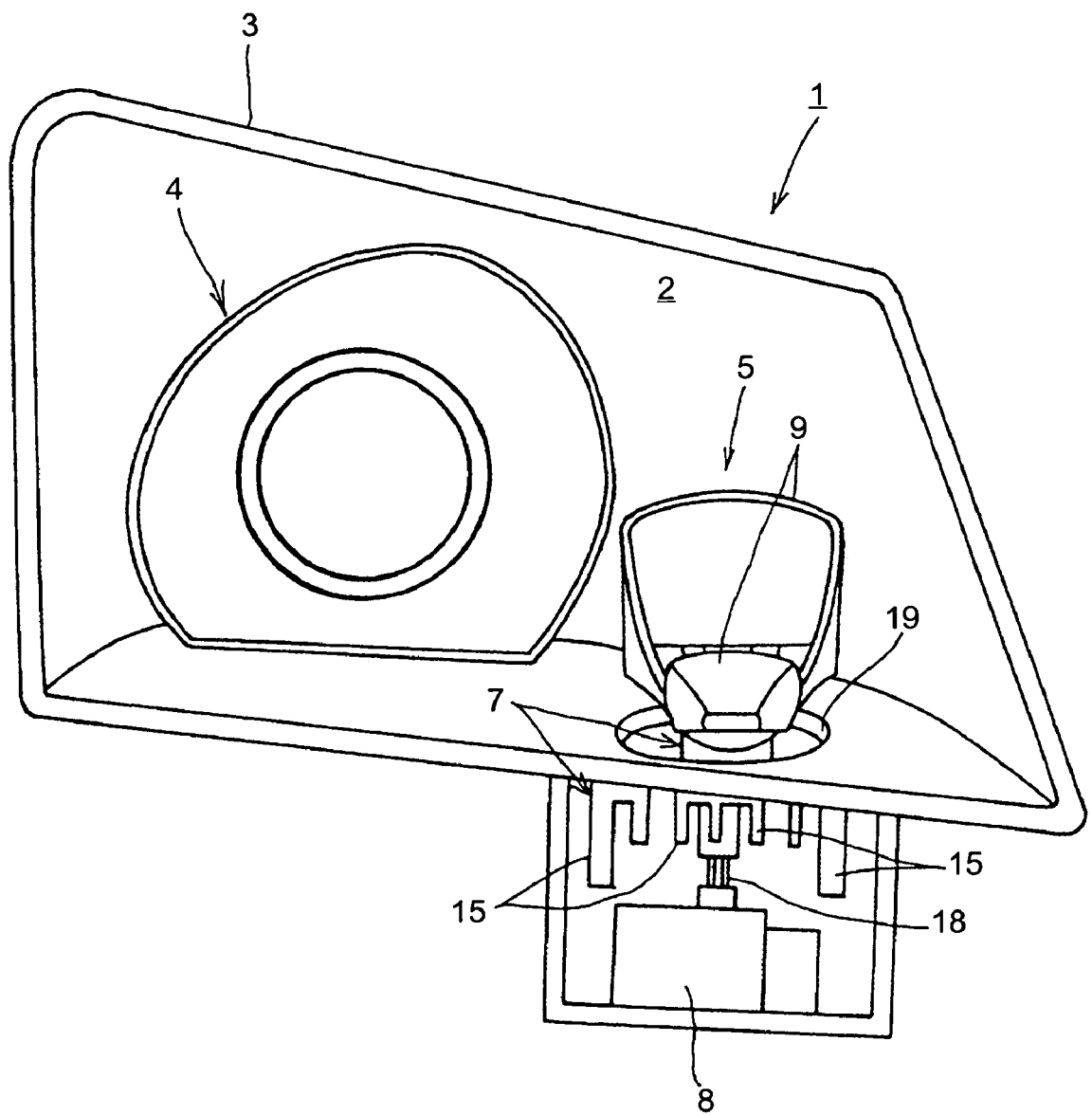
FIG. 1 is a partially sectioned front view of a vehicle lamp according to a first embodiment of the present invention, where a lamp lens has been removed.
Figure 2:
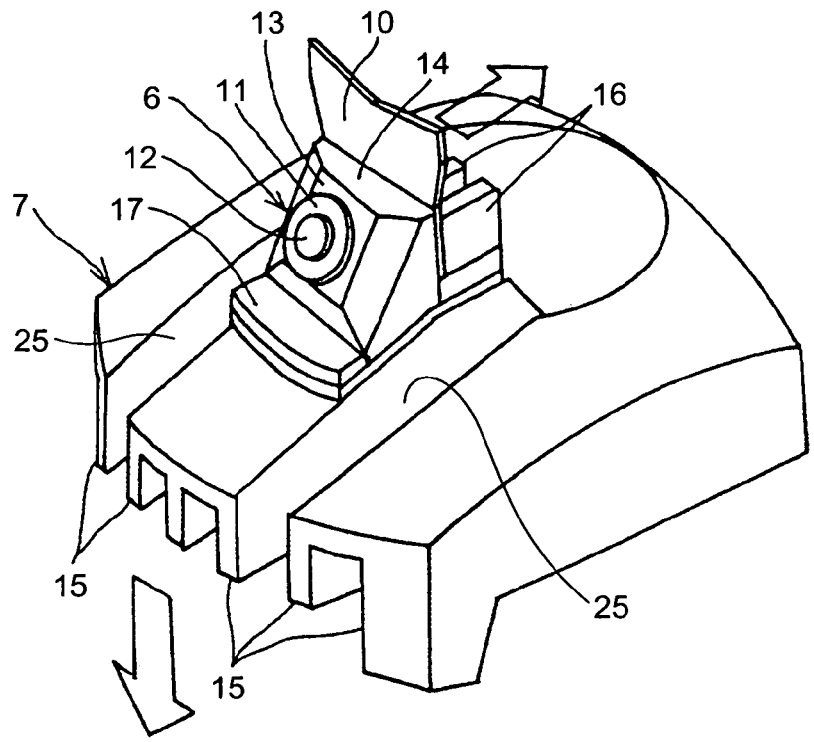
FIG. 2 is a perspective view of a semiconductor light source and a heat sink unit in a swivel lamp unit according to the first embodiment.
Figure 3:
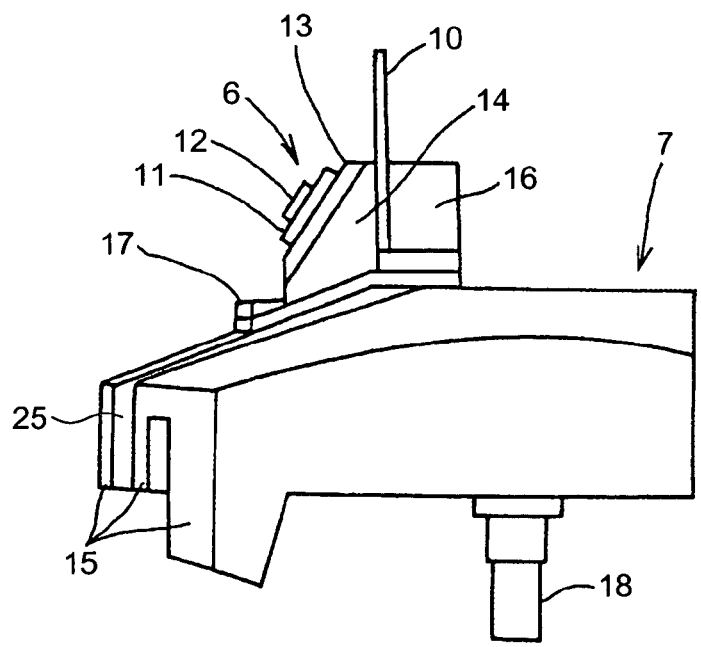
FIG. 3 is a side view of the semiconductor light source and the heat sink unit in the swivel lamp unit according to the first embodiment.
Figure 4:
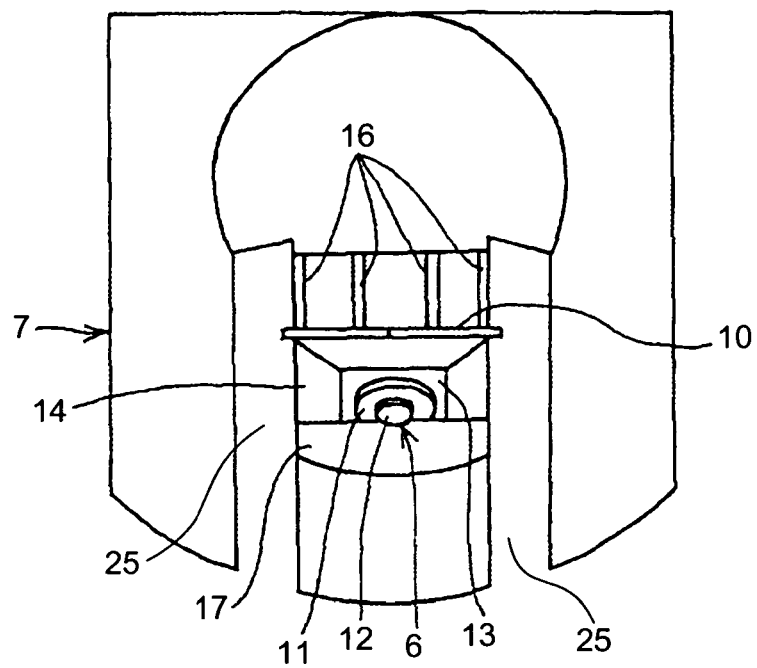
FIG. 4 is a plan view of the semiconductor light source and the heat sink unit in the swivel lamp unit according to the first embodiment.
Figure 5:
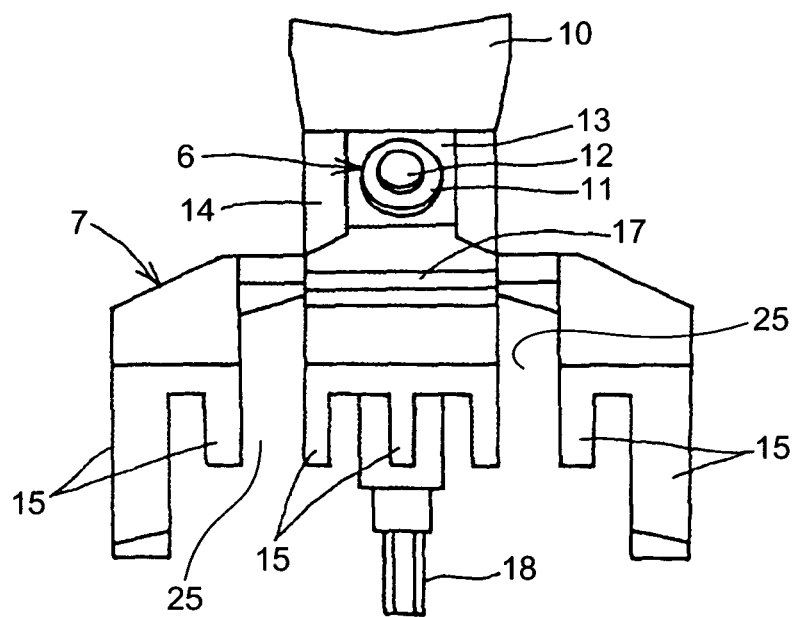
FIG. 5 is a front view of the semiconductor light source and the heat sink unit in the swivel lamp unit according to the first embodiment.
Figure 6:
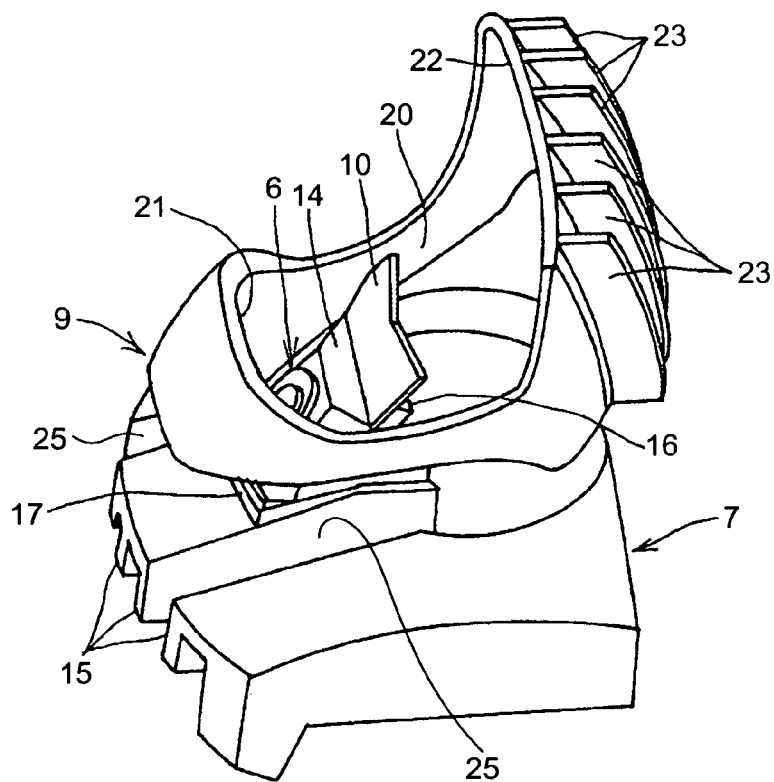
FIG. 6 is a perspective view of the semiconductor light source, the heat sink unit, and a reflector in the swivel lamp unit according to the first embodiment.

FIGS. 1 to 12B depict a vehicle lamp according to a first embodiment of the present invention. A configuration of the vehicle lamp according to the first embodiment is explained below. In FIG. 1, reference numeral 1 denotes the vehicle lamp according to the first embodiment, namely, a front combination lamp. In FIG. 1, reference numeral 5 denotes the vehicle lamp according to the first embodiment, namely, a swivel lamp unit.

As shown in FIG. 1, the vehicle lamp 1 includes a lamp housing 3 and a lamp lens (not shown) that define a lamp chamber 2, and a head lamp unit 4 and the swivel lamp unit 5 that are disposed in the lamp chamber 2.

The head lamp unit 4 can be a head lamp unit of a projector type, a head lamp unit of a reflection type, or the like. The swivel lamp unit 5 can be a bending lamp unit, an additional lamp unit, a curve lamp unit, or the like.

The swivel lamp unit 5 includes a semiconductor light source 6, a heat sink unit 7, a swivel unit 8, a reflector 9, and a shade 10.

The semiconductor light source 6 uses a self-luminous semiconductor light source such as an LED or an EL (an organic EL) (an LED is used in the first embodiment). As shown in FIGS. 2 to 5, the semiconductor light source 6 includes a board 11, a light emitter (not shown) of a light source chip (semiconductor chip) fixed on one face of the board 11, and an optical-transparent member 12 covering the light emitter. The semiconductor light source 6 is directly mounted on the heat sink unit 7. That is, the board 11 of the semiconductor light source 6 is directly mounted on an inclined mounting surface 13 of the heat sink unit 7 integrally. When the heat sink unit 7 is made of metal, an insulating heat conductive film is interposed between the board 11 and the heat sink unit 7.

The heat sink unit 7 is made of a material with excellent heat conductivity, for example, die-cast aluminum. As shown in FIGS. 2 to 5, the heat sink unit 7 has a flat upper face or a curved upper face. A pedestal portion 14 is integrally provided on an approximately central portion of an upper portion of the heat sink unit 7. The inclined mounting surface 13 that is inclined from top to bottom is provided on a front face of the pedestal portion 14 of the heat sink unit 7. The heat sink unit 7 configures a pedestal for the semiconductor light source 6.

A lower radiation portion 15 formed in a fin shape is integrally provided on a lower face of the heat sink unit 7. The shade 10 is integrally provided on a back face (rear face) of the pedestal portion 14 of the heat sink unit 7. A rear radiation portion 16 formed in a fin shape and serving as an auxiliary heat sink unit is integrally provided on the pedestal portion 14 of the heat sink unit 7 and a rear face (back face) of the shade 10. Fin shapes or fin-forming directions of the lower radiation portion 15 and the rear radiation portion 16 are not limited to specific ones. Each of the lower radiation portion 15 and the rear radiation portion 16 can be a plate shape or a pin shape instead of the fin shape. The lower radiation portion 15 or the rear radiation portion 16 can be manufactured as a separate part to be attached to a corresponding portion.

A thick portion (an extra thickness portion) 17 is integrally provided on a connection portion between the lower radiation portion 15 and the rear radiation portion 16 of the heat sink unit 7, namely, a connection portion between the upper face and the pedestal portion 14 of the heat sink unit 7. The lower radiation portion 15 of the heat sink unit 7 is divided into a central portion (lower radiation portion piece) including the pedestal portion 14, the rear radiation portion 16, and the thick portion 17, and both left and right side portions (lower radiation portion pieces) via groove portions 25. The groove portions 25 are provided for improving radiation effect.

A swivel shaft 18 is integrally provided on a lower face of the heat sink unit 7, namely, the lower radiation portion 15. The swivel shaft 18 can be provided between the lower radiation portion (lower radiation portion piece) 15 and the lower radiation portion (lower radiation portion piece) 15, or it can be provided at a portion of the fin-shaped lower radiation portion (lower radiation piece) 15 that has been cut off. The swivel shaft 18 is coupled to the swivel unit 8. The swivel unit 8 is attached to a lower portion of the lamp housing 3. The lamp housing 3 includes a through-hole 19 formed therein. One portion of the heat sink unit 7 is inserted into the through-hole 19. As a result, the inclined mounting surface 13, the pedestal portion 14, the rear radiation portion 16, and the semiconductor light source 6 of the heat sink unit 7 are positioned inside the lamp chamber 2, while the lower radiation portion 15 and the swivel shaft 18 of the heat sink unit 7 are positioned outside the lamp chamber 2.

The reflector 9 is attached to the pedestal portion 14 of the heat sink unit 7 via a proper connector such as a screw. As a result, the reflector 9 is provided on the heat sink unit 7. The reflector 9 is made of an excellent heat conductivity material, for example, die-cast aluminum, in the embodiment like the heat sink unit 7. As shown in FIGS. 6 to 9, the reflector 9 includes a first reflecting surface 21 and a second reflecting surface 22. The first reflecting surface 21 is a reflecting surface mainly formed in an ellipsoid, while the second reflecting surface 22 is a reflecting surface mainly formed in a paraboloid.

A light emitter of a light source chip of the semiconductor light source 6 is positioned at a first focal point of the first reflecting surface 21 or a portion near the same. An edge of the shade 10 is positioned at a second focal point of the first reflecting surface or near the same. The first reflecting surface 21 is positioned forward of the semiconductor light source 6 and slightly above the same. On the other hand, the second reflecting surface 22 is positioned rearward of the semiconductor light source 6 and above the same, and is positioned rearward of the first reflecting surface 21 and above the same. The focal point of the second reflecting surface 22 is positioned at the second focal point of the first reflecting surface, the edge of the shade 10, or near the shade 10. A space 20 is formed between the first reflecting surface 21 and the second reflecting surface 22. The shade 10 is positioned in the space 20. The semiconductor light source 6 faces the first reflecting surface 21 such that 0° axis of the semiconductor light source 6 is approximately perpendicular to the first reflecting surface 21. As a result, light with high luminosity from the semiconductor light source 6 is incident on the first reflecting surface 21.

A fin-shaped auxiliary radiation portion 23 is integrally provided on a backside of the second reflecting surface 22 of the reflector 9. A fin shape or a fin forming direction of the auxiliary radiation portion 23 is not limited to specific one. The auxiliary radiation portion 23 can be a plate shape, a pin shape, or a small undulated shape.

Figure 11A:
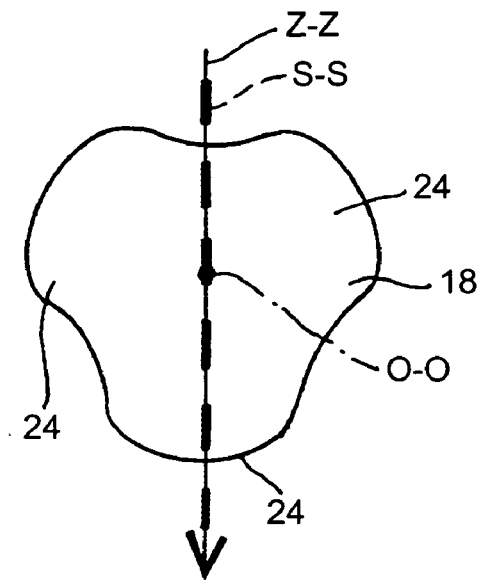
FIG. 11A is a cross-sectional explanatory diagram (a horizontally sectioned explanatory diagram) of a swivel shaft of a relative relationship among a centerline of the swivel axis, an optical axis, and a swivel reference axis in a state that the optical axis and the swivel reference axis coincide with each other in a rotation direction according to the first embodiment.
Figure 11B:
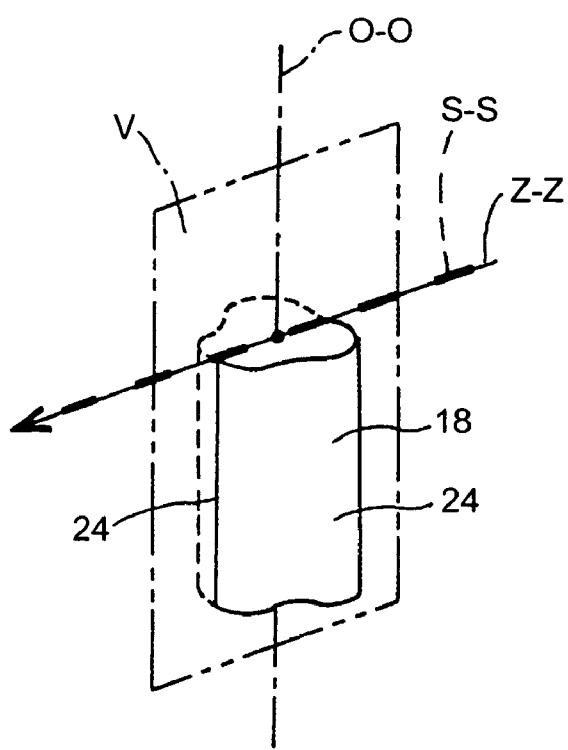
FIG. 11B is a perspective explanatory diagram of the swivel shaft of the relative relationship among the centerline of the swivel axis, the optical axis, and the swivel reference axis in a state that the optical axis and the swivel reference axis coincide with each other in the rotation direction according to-the first embodiment.
Figure 12A:
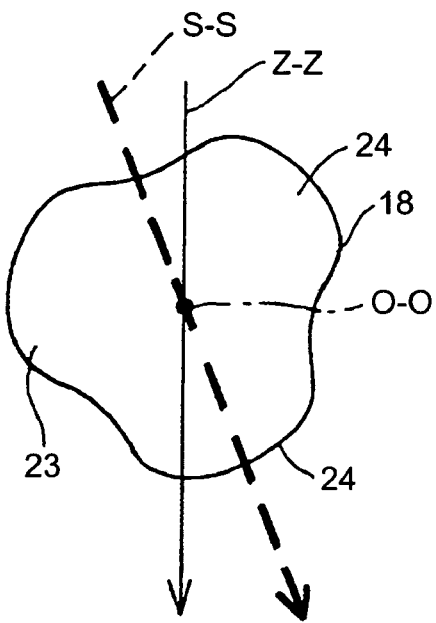
FIG. 12A is a cross-sectional explanatory diagram (a horizontally sectioned explanatory diagram) of the swivel shaft of a relative relationship among the centerline of the swivel axis, the optical axis, and the swivel reference axis in a state that the optical axis and the swivel reference axis are offset from each other in the rotation direction according to the first embodiment.
Figure 12B:
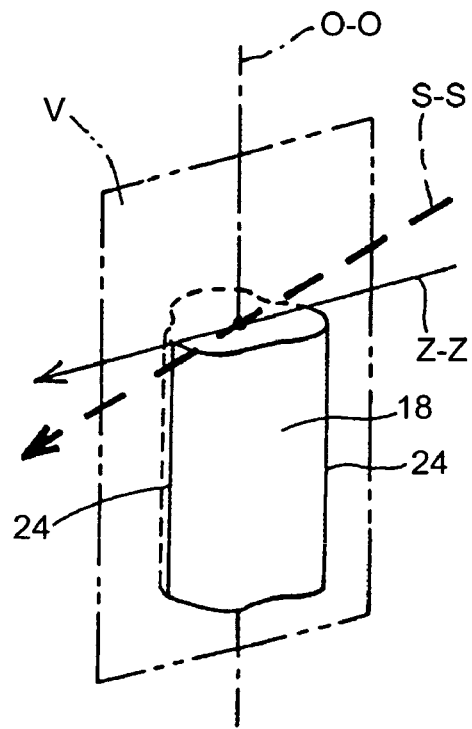
FIG. 12B is a perspective explanatory diagram of the swivel shaft of the relative relationship among the centerline of the swivel axis, the optical axis, and the swivel reference axis in a state that the optical axis and the swivel reference axis are offset from each other in the rotation direction according to the first embodiment.
Figure 13:
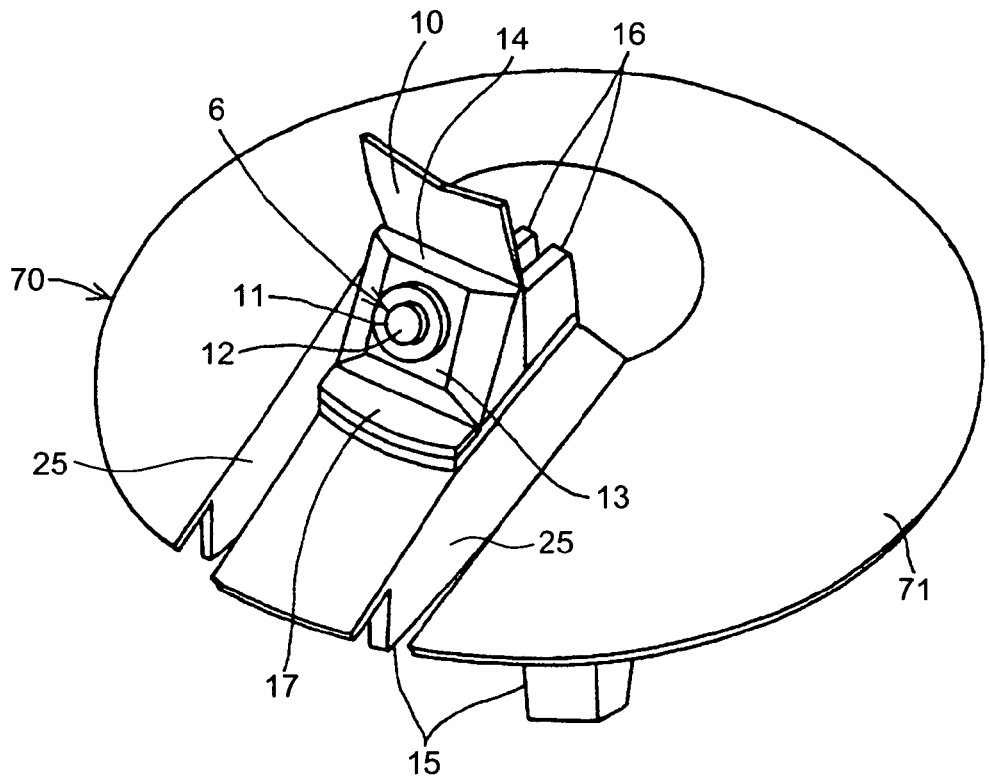
FIG. 13 is a perspective view of a semiconductor light source and a heat sink unit in a swivel lamp unit of a vehicle lamp according to a second embodiment of the present invention.
Figure 14:
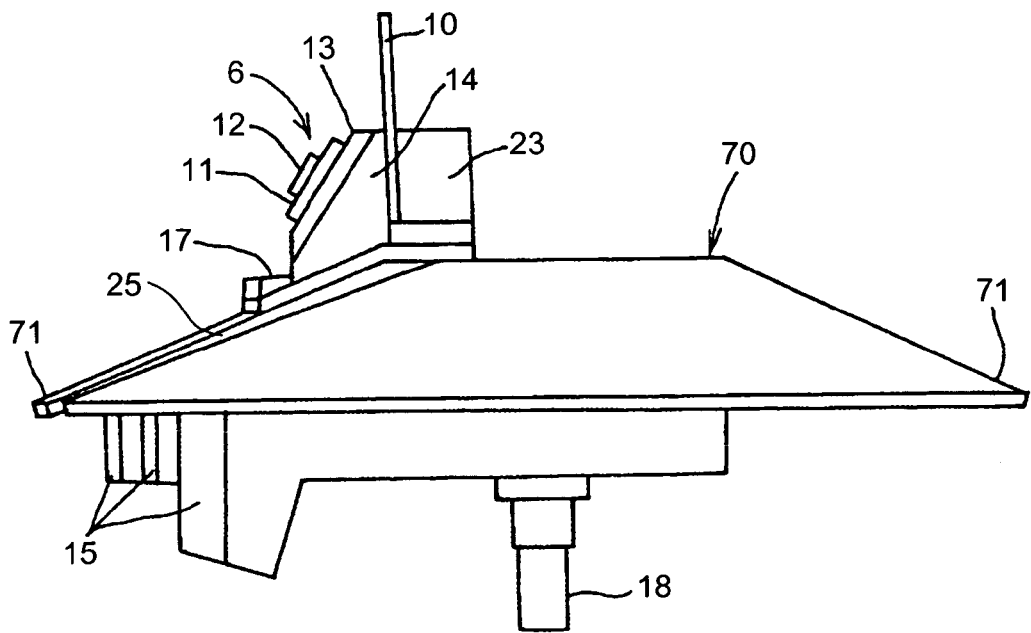
FIG. 14 is a side view of the semiconductor light source and the heat sink unit in the swivel lamp unit according to the second embodiment.
Figure 15:
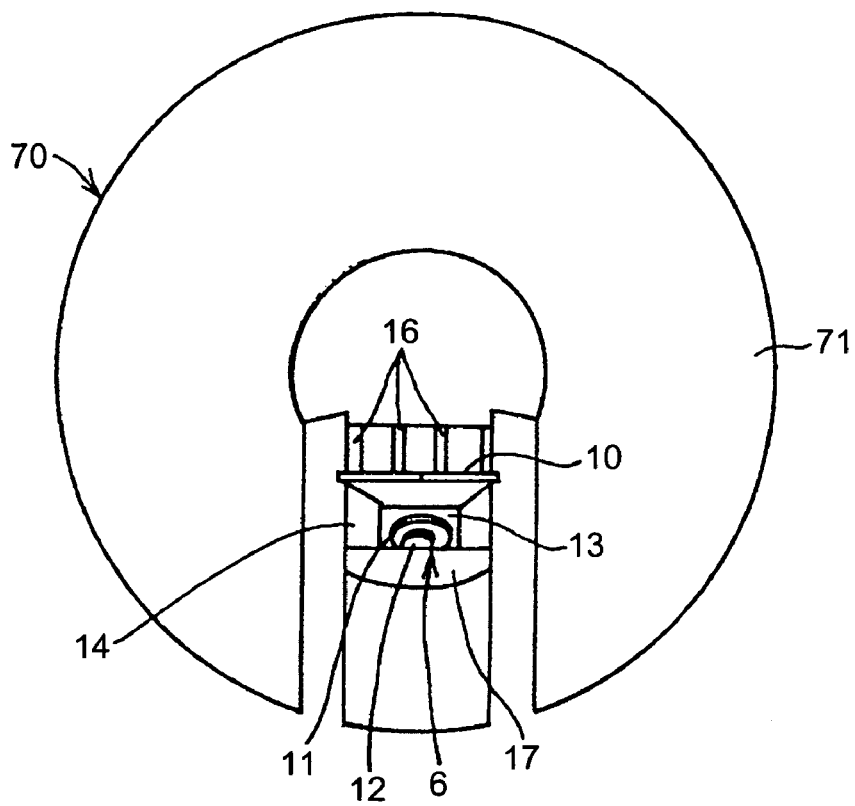
FIG. 15 is a plan view of the semiconductor light source and the heat sink unit in the swivel lamp unit according to the second embodiment.
Figure 16:
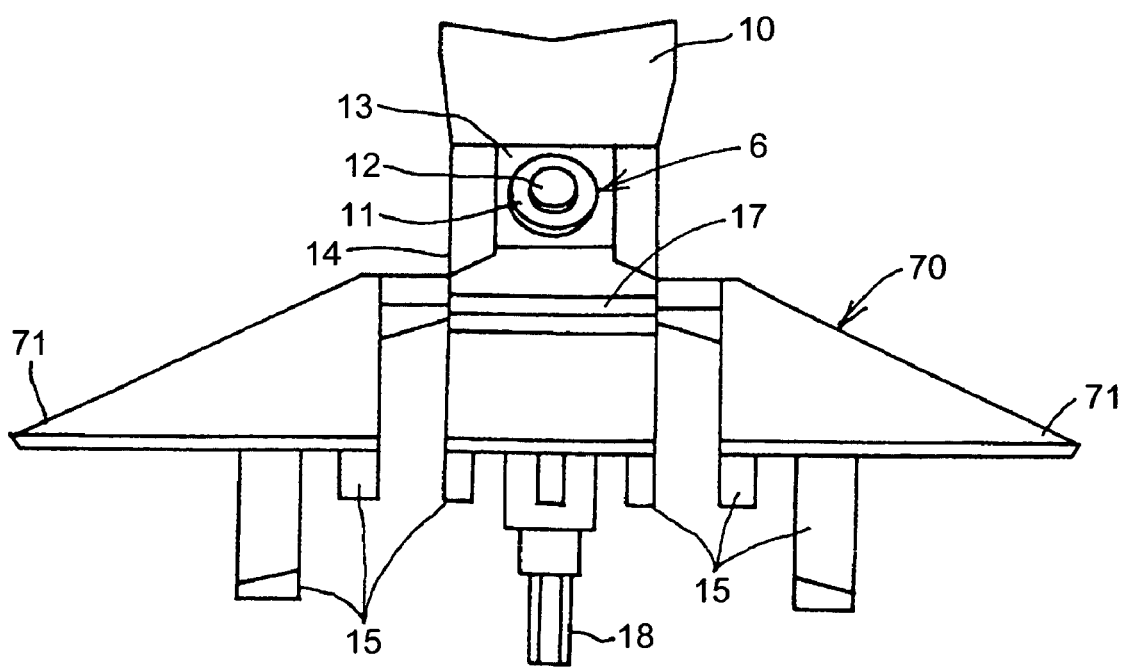
FIG. 16 is a front view of the semiconductor light source and the heat sink unit in the swivel lamp unit according to the second embodiment.
Figure 17:
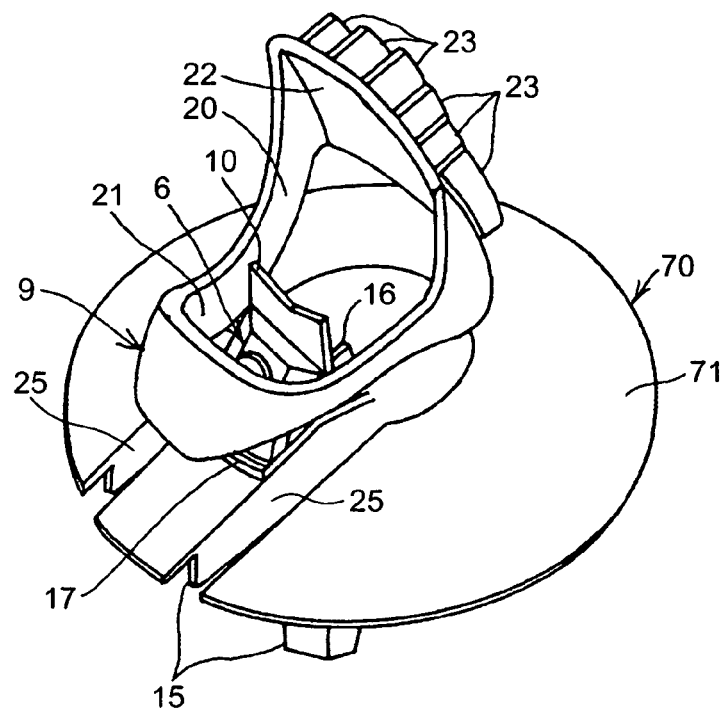
FIG. 17 is a perspective view of the semiconductor light source, the heat sink unit, and a reflector in the swivel lamp unit according to the second embodiment.

As shown in FIGS. 11A, 11B, 12A, and 12B, a centerline (a center axis) O-O (shown by a dashed-dotted line in the drawings) of the swivel shaft 18 is disposed on an approximately perpendicular face V (shown by a dashed-two dotted line in the drawings) including an optical axis Z-Z (shown by a solid line in the drawings) of the first reflecting surface 21 and the second reflecting surface 22 that reflect light from the semiconductor light source 6 in predetermined directions. A swivel reference axis (a swivel positioning axis) S-S (shown by a thick broken line in the drawings) indicating a neutral position (an initial position of the swivel shaft 18) of the swivel shaft 18 and the optical axis Z-Z are caused to approximately coincide with each other, as shown in FIGS. 11A and 11B. Alternately, as shown in FIGS. 12A and 12B, the swivel reference axis S-S is rotated to the optical axis Z-Z around the centerline O-O of the swivel shaft 18 by an arbitrary angle.

A positioning unit 24 is provided on the swivel shaft 18 and the swivel shaft-coupling portion (not shown) of the swivel unit 8. The positioning unit 24 includes three projections provided on the swivel shaft 18 and three recesses (not shown) provided on the swivel shaft-coupling portion of the swivel unit 8.

The vehicle lamp 1 according to the first embodiment is configured as described above, and an operation thereof is explained below. The semiconductor light source 6 is first lightened for light emission. Thereby, light from the semiconductor light source 6 is incident on the first reflecting surface 21 so that it is primarily reflected from the first reflecting surface 21. A portion of the primarily reflected light is cut off by the shade 10 and the remaining portion thereof is incident on the second reflecting surface 22 so that it is secondarily reflected from the second reflecting surface 22. The secondarily reflected light is irradiated to the outside with a predetermined light distribution pattern.

When the swivel unit 8 is driven, a rotation portion (the semiconductor light source 6, the heat sink unit 7, the reflector 9, and the shade 10) of the swivel lamp unit 5 is rotated around the centerline O-O of the swivel shaft 18 via the swivel shaft 18 leftward or rightward by a predetermined angle. Along with the rotation, a light distribution pattern with a predetermined shape is moved leftward or rightward by a predetermined angle.

Heat generated in the semiconductor light source 6 is transferred to the pedestal portion 14 of the heat sink unit 7 via the board 11 of the semiconductor light source 6. The heat transferred to the pedestal portion 14 is radiated (emitted) from the lower radiation portion 15 and the rear radiation portion 16 downward and rearward of the semiconductor light source 6, as shown by an outlined arrow in FIG. 2. Since the rear radiation portion 16 is positioned in the space between the first reflecting surface 21 and the second reflecting surface 22 of the reflector 9 in a heat convection direction, favorable airflow and excellent radiation effect can be obtained.

Figure 7:
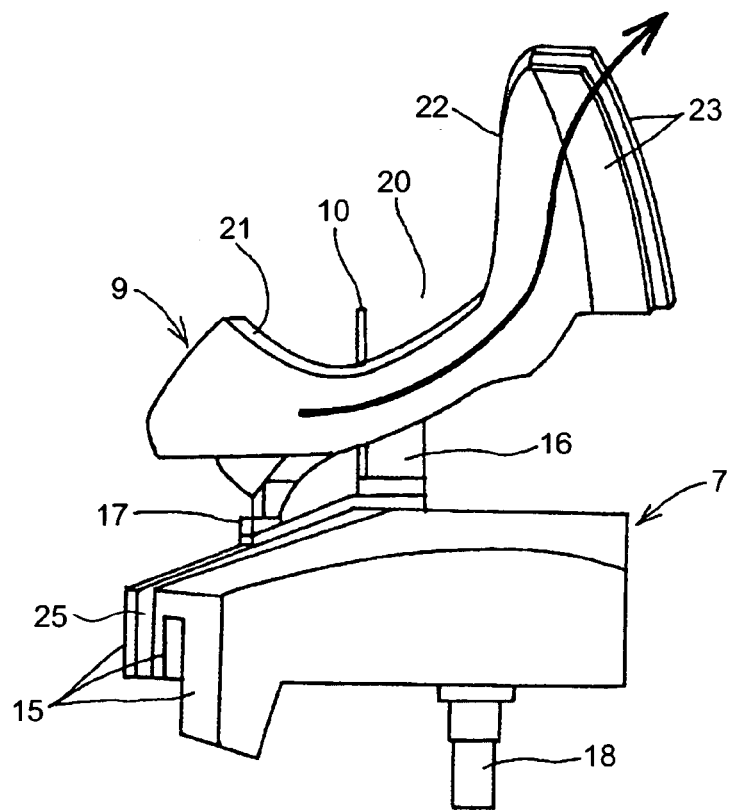
FIG. 7 is a side view of the semiconductor light source, the heat sink unit, and the reflector in the swivel lamp unit according to the first embodiment.
Figure 8:
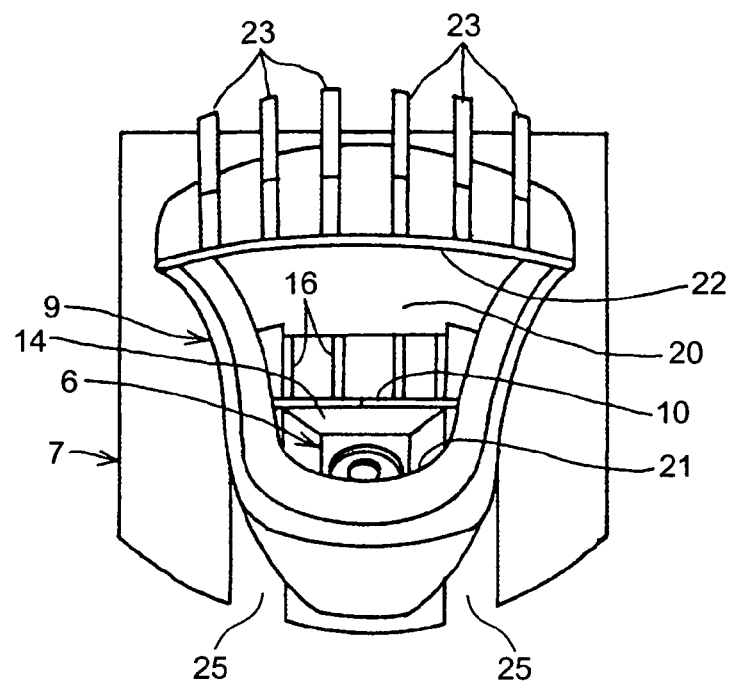
FIG. 8 is a plan view of the semiconductor light source, the heat sink unit, and the reflector in the swivel lamp unit according to the first embodiment.
Figure 9:
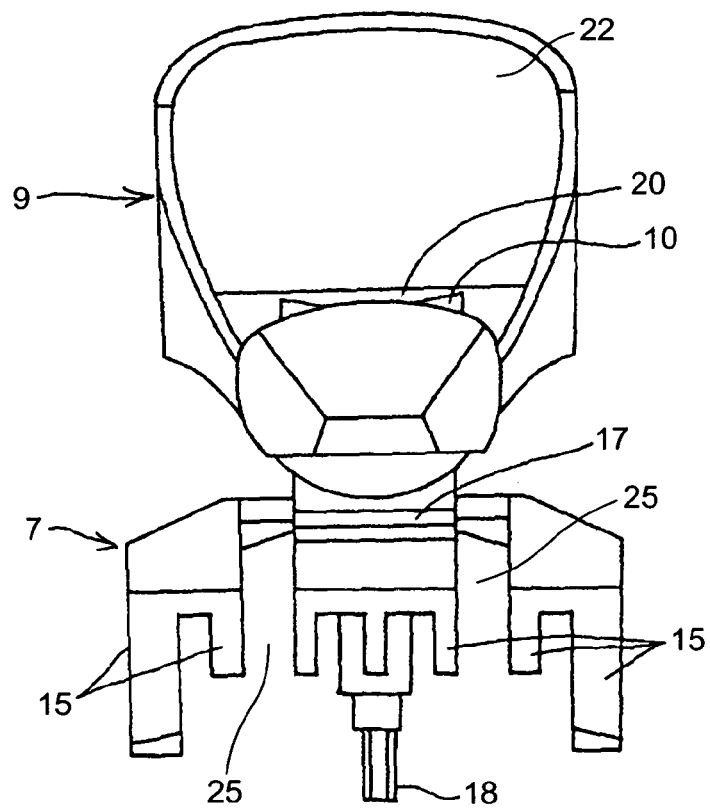
FIG. 9 is a front view of the semiconductor light source, the heat sink unit, and the reflector in the swivel lamp unit according to the first embodiment.
Figure 10:
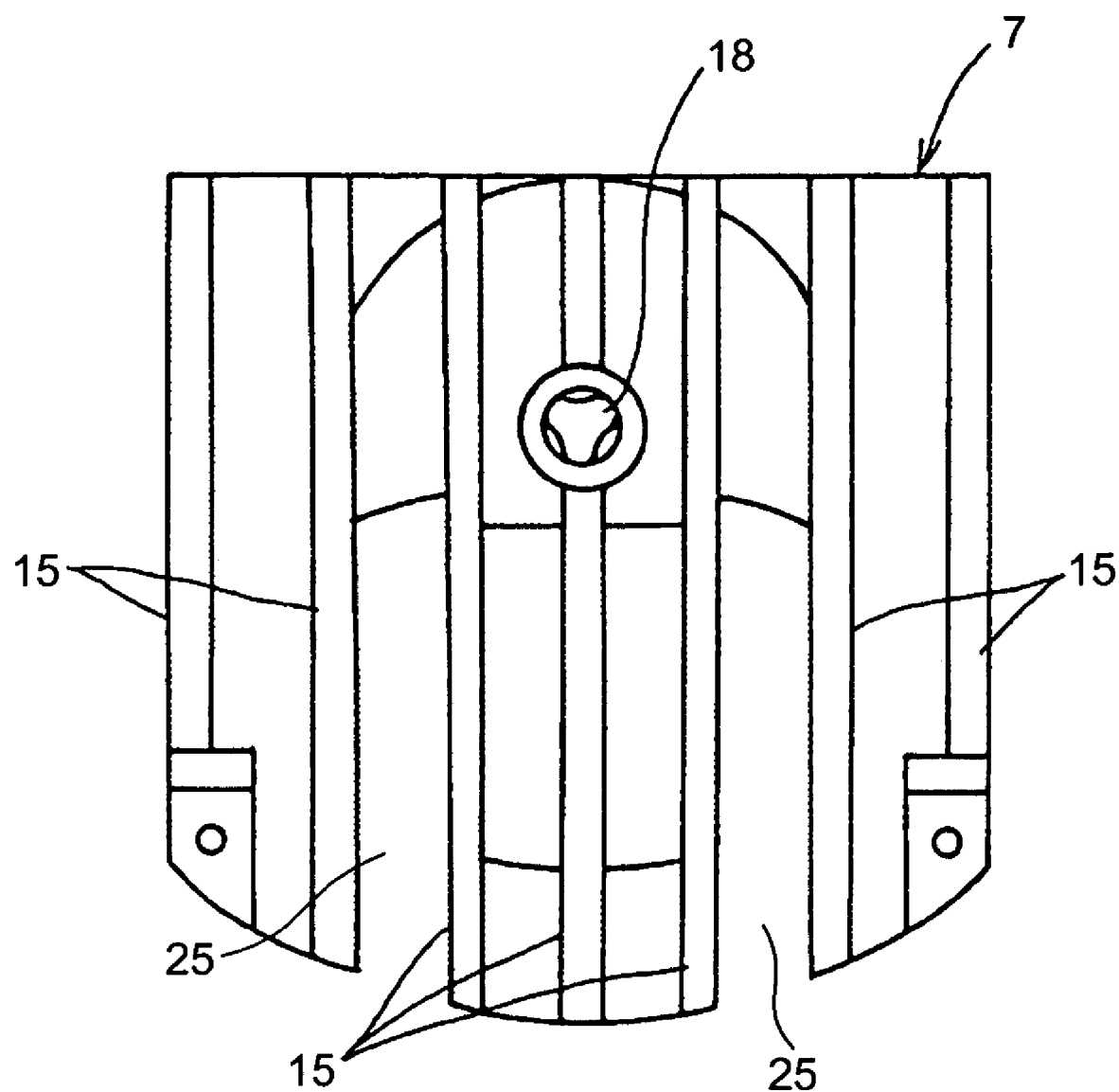
FIG. 10 is a bottom view of the heat sink unit in the swivel lamp unit according to the first embodiment.

On the other hand, heat transferred to the pedestal portion 14 is radiated from the auxiliary radiation portion 23 of the second reflecting surface 22 rearward of the semiconductor light source 6 via the reflector 9, as shown by a thick solid line arrow in FIG. 7. Since the auxiliary radiation portion 23 is positioned behind the semiconductor light source 6 and above the same, namely, in the heat convection direction, heat can be radiated efficiently.

The vehicle lamp 1 according to the first embodiment has the configuration and operation as described above, and effects thereof are described below. In the vehicle lamp 1 and the swivel lamp unit 5 according to the first embodiment, since the semiconductor light source 6 and the heat sink unit 7 on which the semiconductor light source 6 has been directly mounted are coupled to the swivel unit 8 via the swivel shaft 18, an irradiating direction of light can be swiveled in a vehicle lamp using the semiconductor light source 6 as the light source. In the vehicle lamp 1 and the swivel lamp unit 5 according to the first embodiment, since the swivel shaft 18 coupled to the swivel unit 8 is integrally provided to the heat sink unit 7, the number of parts can be reduced and manufacturing cost can be decreased. In the vehicle lamp 1 and the swivel lamp unit 5 according to the first embodiment, by integrating the swivel shaft 18 and the heat sink unit 7 on the semiconductor light source 6 side with each other, a relative positional deviation between the swivel shaft 18 and the semiconductor light source 6 can be avoided reliably, and an irradiation direction of light can be swivel-controlled reliably and accurately. In the vehicle lamp 1 and the swivel lamp unit 5 according to the first embodiment, since the heat sink unit 7 can be swiveled, heat is diffused according to the swivel of the heat sink unit 7 so that radiation effect can be improved.

In the vehicle lamp 1 and the swivel lamp unit 5 according to the first embodiment, since the centerline O-O of the swivel shaft 18 is positioned on an approximately vertical face V including the optical axis Z-Z, a relative positional deviation between the neutral position (the swivel reference axis S-S) that is the initial position of the swivel shaft 18 and the optical axis Z-Z can be avoided reliably and easily. In the vehicle lamp 1 and the swivel lamp unit 5 according to the first embodiment, the neutral position (swivel reference axis S-S) of the swivel shaft 18 can be accurately set at an arbitrary angle to the optical axis Z-Z around the centerline O-O of the swivel shaft 18, as shown in FIGS. 12A and 12B. That is, the swivel reference axis S-S (or the optical axis Z-Z) can be offset to the optical axis Z-Z (or the swivel reference axis S-S) around the center axis O-O (in the rotation direction) of the swivel shaft 18. In the vehicle lamp 1 and the swivel lamp unit 5 according to the first embodiment, a ratio of left or right swivel angle to the optical axis Z-Z can be set arbitrarily and accurately.

Furthermore, in the vehicle lamp 1 and the swivel lamp unit 5 according to the first embodiment, since the swivel shaft 18 and the swivel unit 8 are coupled via the positioning unit 24 (the projections and the recesses), a deviation in relative position between the swivel shaft 18 and the semiconductor light source 6, a deviation in relative position between the neutral position (swivel reference axis S-S) of the swivel shaft 18 and the optical axis Z-Z, or the like can be avoided further reliably.

Further, in the vehicle lamp 1 and the swivel lamp unit 5 according to the first embodiment, since the shade 10 and the swivel shaft 18 are integrated with each other via the pedestal portion 14 and the lower radiation portion 15 of the heat sink unit 7, a deviation in relative position between the shade 10 and the swivel shaft 18 can be avoided reliably, and swivel of a light distribution pattern can be controlled reliably and accurately.

Further, in the vehicle lamp 1 and the swivel lamp unit 5 according to the first embodiment, a light distribution pattern with a predetermined shape can be formed by the first reflecting surface 21 mainly formed in an ellipsoid, the second reflecting surface 22 mainly formed in a paraboloid, and the shade 10. In the vehicle lamp 1 and the swivel lamp unit 5 according to the first embodiment, since the rear radiation portion 16 serving as an auxiliary heat sink unit is integrally provided on the shade 10 (the pedestal portion 14), heat generated in the semiconductor light source 6 can be radiated further efficiently, the number of parts can be reduced, and the manufacturing cost can be decreased. In the vehicle lamp 1 and the swivel lamp unit 5 according to the first embodiment, the shade 10 (the pedestal portion 14) is integrally provided on the heat sink unit 7, the number of parts can be reduced and the manufacturing cost can be decreased correspondingly.

In the vehicle lamp 1 and the swivel lamp unit 5 according to the first embodiment, particularly, since light from the semiconductor light source 6 can be reflected by the first reflecting surface 21 and the second reflecting surface 22 to be irradiated in a predetermined direction, the semiconductor light source 6 can be disposed in an inclined state thereof. As a result, in the vehicle lamp 1 and the swivel lamp unit 5 according to the first embodiment, since the lower radiation portion 15 and the rear radiation portion 16 can be provided on a lower face and a back face of the pedestal portion 14 by mounting the semiconductor light source 6 on the inclined mounting surface 13 of the pedestal portion 14 of the heat sink unit 7 in the inclined state, the lower radiation portion 15 and the rear radiation portion 16 coincide with the heat convection direction. In the vehicle lamp 1 and the swivel lamp unit 5 according to the first embodiment, therefore, since the lower radiation portion 15 and the rear radiation portion 16 can be disposed near the semiconductor light source 6 and in an ideal shape to the heat convection direction, heat generated in the semiconductor light source 6 can be radiated by the lower radiation portion 15 and the rear radiation portion 16 efficiently. In the vehicle lamp 1 and the swivel lamp unit 5 according to the first embodiment, since the rear radiation portion 16 can be provided on the rear face of the pedestal portion 14 in an approximately ideal shape to the heat convection direction, the rear radiation portion 16 is not so conspicuous, so that appearance quality of the vehicle lamp can be improved correspondingly.

In the vehicle lamp 1 and the swivel lamp unit 5 according to the first embodiment, since the thick portion (the extra thickness portion) 17 is provided on the connection portion between the lower radiation portion 15 and the rear radiation portion 16, namely, the connection portion between the upper face of the heat sink unit 7 and the pedestal portion 14, heat conductivity from the pedestal portion 14 to the lower radiation portion 15 and the rear radiation portion 16 is favorable, and the radiation effect can be further improved.

Furthermore, in the vehicle lamp 1 and the swivel lamp unit 5 according to the first embodiment, since the rear radiation portion 16 in the space 20 between the first reflecting surface 21 and the second reflecting surface 22 of the reflector 9 is positioned in the heat convention direction, flow of air is favorable so that the radiation effect can be further improved. In addition, in the vehicle lamp 1 and the swivel lamp unit 5 according to the first embodiment, since the heat sink unit 7 and the reflector 9 are integrated with each other, a lamp unit can be made compact.

Further, in the vehicle lamp 1 and the swivel lamp unit 5 according to the first embodiment, since the auxiliary radiation portion 23 is integrally provided on the back face side of the second reflecting surface 22 of the reflector 9, the radiation effect can be further improved, the number of parts can be reduced, and the manufacturing cost can be decreased.

Further, in the vehicle lamp 1 and the swivel lamp unit 5 according to the first embodiment, since the heat sink unit 7 and the reflector 9 are made of a material with excellent heat conductivity, for example, die-cast aluminum in the present embodiment, the radiation effect is further improved.

In the vehicle lamp 1 and the swivel lamp unit 5 according to the first embodiment, thus, since the semiconductor light source 6 is directly fixed on the heat sink unit 7, heat generated in the semiconductor light source 6 can be radiated efficiently by the lower radiation portion 15 and the rear radiation portion 16 of the heat sink unit 7, and the auxiliary radiation portion 23 of the reflector 9. In the vehicle lamp 1 and the swivel lamp unit 5 according to the first embodiment, therefore, an LED with high wattage that outputs high beam amount can be used.

FIGS. 13 to 21 depict a vehicle lamp according to a second embodiment of the present invention. The vehicle lamp according to the second embodiment is explained below. In FIGS. 13 to 21, like reference numerals as those in the FIGS. 1 to 12B denote like members or parts.

A heat sink unit 70 used in the vehicle lamp and the swivel lamp unit according to the second embodiment is different from the heat sink unit 7 used in the vehicle lamp 1 and the swivel lamp unit 5 according to the first embodiment. That is, as shown in FIGS. 14, 16, 18, and 20, a side portion 71 of the heat sink unit 70 is inclined in a spreading manner from its upper portion toward its lower portion. As shown in FIG. 21, the side portion 71 of the heat sink unit 70 is formed in a fin shape. The fin shape and a fin formation direction of the side portion 71 of the heat sink unit 70 are not limited to specific ones. The side portion 71 of the heat sink unit 70 can be formed in a plate shape or a pin shape besides the fin shape. The heat sink unit 70 has a turntable shape rotating around the swivel shaft 18 as viewed from the above, for example, a truncated cone turntable shape in the present embodiment.

The vehicle lamp and the swivel lamp unit according to the second embodiment are configured as described above, and operations and effects thereof are explained below. In the vehicle lamp and the swivel lamp unit according to the second embodiment, since the side portion 71 of the heat sink unit 70 is inclined in a spreading manner from the upper portion toward the lower portion, it is positioned along heat convection so that heat generated in the semiconductor light source 6 can be radiated further efficiently.

Figure 20:
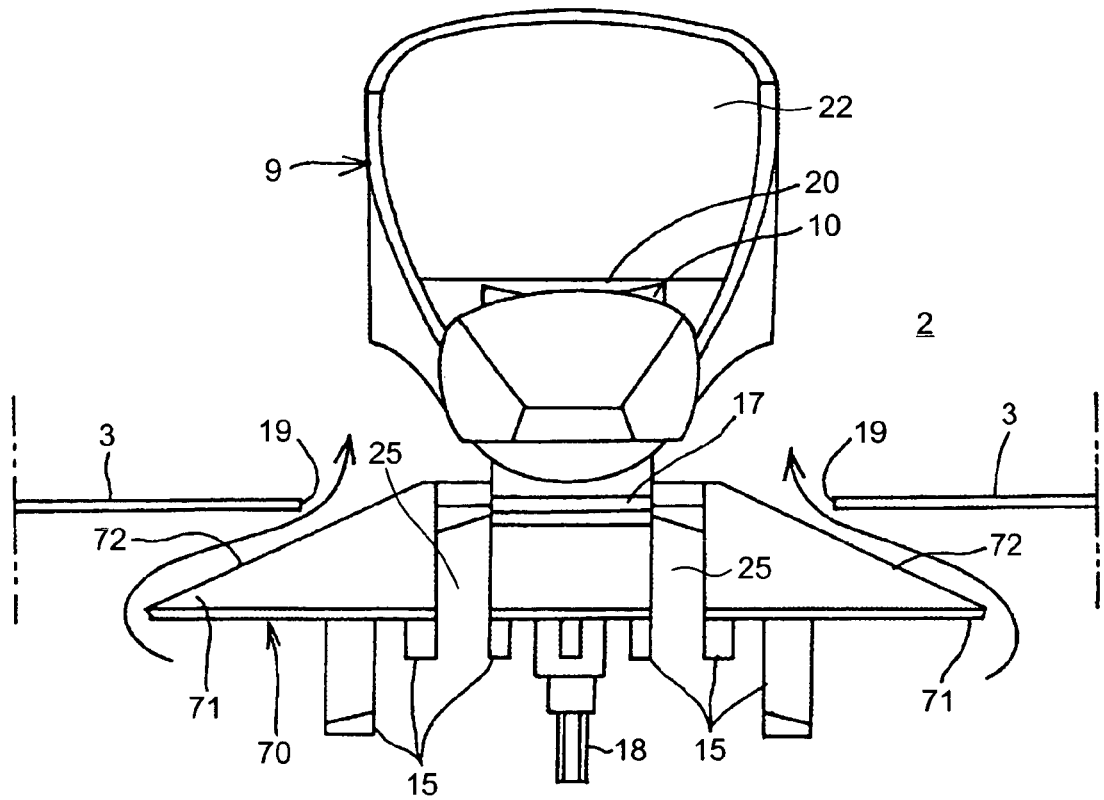
FIG. 20 is a front view of the semiconductor light source, the heat sink unit, and the reflector in the swivel lamp unit according to the second embodiment.
Figure 21:
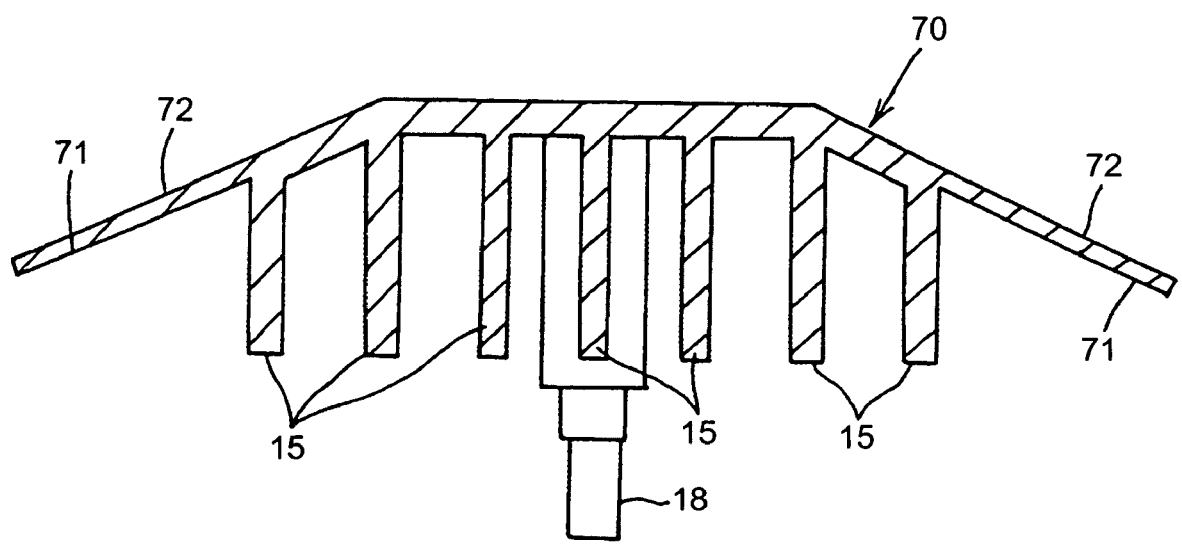
FIG. 21 is a vertical cross-sectional view of the heat sink unit according to the second embodiment.

In the vehicle lamp and the swivel lamp unit according to the second embodiment, as shown in FIG. 20, a portion of the heat sink unit 70 is inserted into the through-hole 19 in the bottom plate of the lamp housing 3 serving as a concealing plate, an edge of the through-hole 19 in the bottom plate of the lamp housing 3 is opposed to an upper portion of the inclined side portion 71 of the heat sink unit 70, and a portion of the inclined side portion 71 of the heat sink unit 70 positioned below an upper portion thereof is disposed outside the lamp chamber 2. Consequently, the portion of the inclined side portion 71 of the heat sink unit 70 positioned below the upper portion thereof can be concealed by the bottom plate of the lamp housing 3 serving as the concealing plate. As a result, when the inside of the lamp chamber 2 is viewed from the lamp lens of the vehicle lamp, the portion of the inclined side portion 71 of the heat sink unit 70 positioned below the upper portion thereof cannot be seen, because it is concealed by the bottom plate of the lamp housing 3. Therefore, appearance quality of the vehicle lamp can be improved.

Furthermore, in the vehicle lamp and the swivel lamp unit according to the second embodiment, as shown in FIG. 20, a space is formed between the inclined face 72 of the side portion 71 of the heat sink unit 70 inclined in a spreading manner from the upper portion to the lower portion and a back face of the bottom plate of the lamp housing 3 serving as the concealing plate. As a result, heat convection (see solid line arrows in FIG. 20) is not blocked owing the space and the through-hole 19 in the lamp housing 3, so that a high radiation effect can be maintained. Therefore, in the vehicle lamp and the swivel lamp unit according to the second embodiment, improvement of the appearance quality of the vehicle lamp and maintenance of the high radiation effect can be made compatible.

Further, in the vehicle lamp and the swivel lamp unit according to the second embodiment, the side portion 71 of the heat sink unit 70 is formed in the fin shape, and heat generated in the semiconductor light source 6 can be radiated further efficiently.

Figure 18:
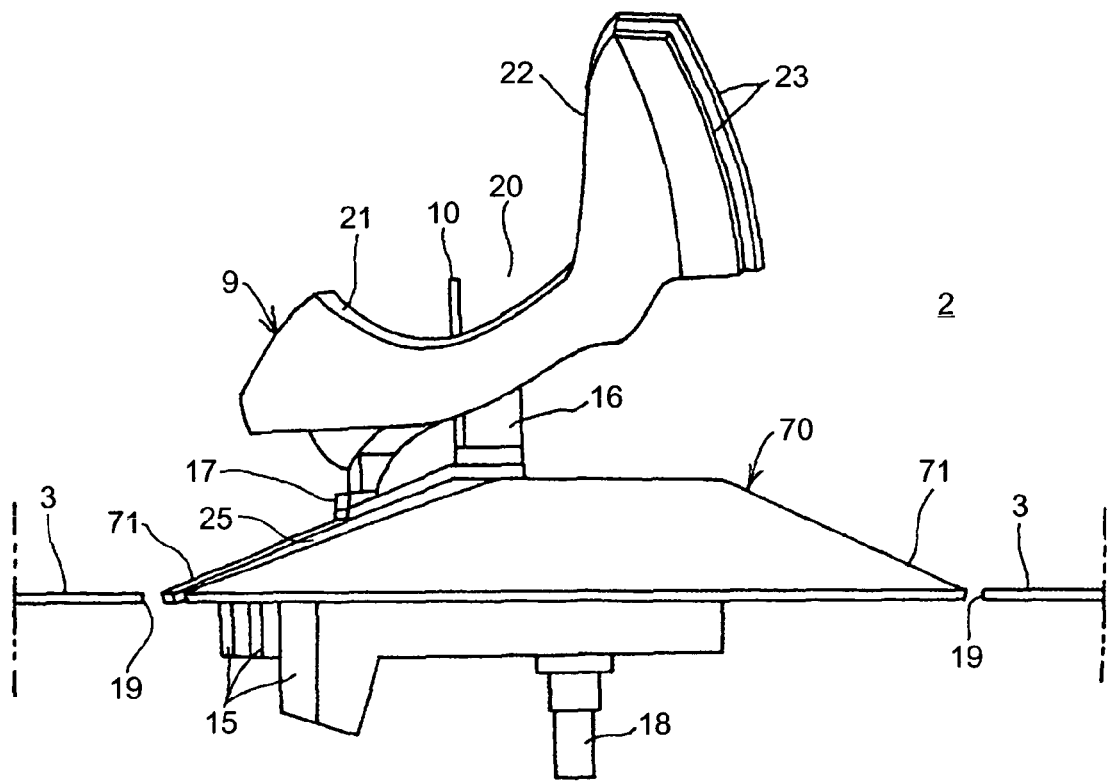
FIG. 18 is a side view of the semiconductor light source, the heat sink unit, and the reflector in the swivel lamp unit according to the second embodiment.
Figure 19:
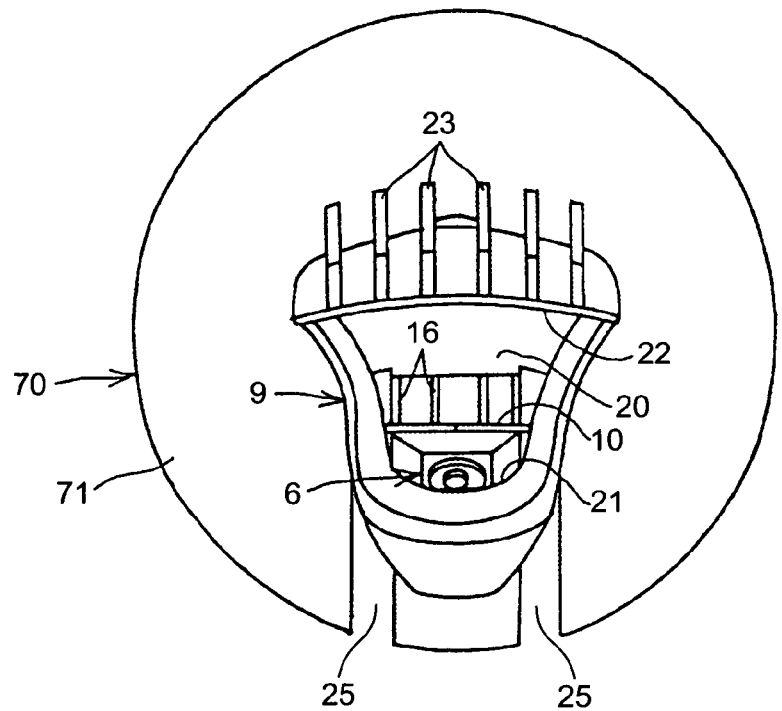
FIG. 19 is a plan view of the semiconductor light source, the heat sink unit, and the reflector in the swivel lamp unit according to the second embodiment.

Further, in the vehicle lamp and the swivel lamp unit according to the second embodiment, the heat sink unit 70 has the turntable shape rotating around the swivel shaft 18, for example the truncated cone turntable shape, as viewed from the above. Accordingly, as shown in FIG. 18, even when the inclined side portion 71 of the heat sink unit 70 is disposed inside the lamp, namely, inside the lamp chamber 2, appearance of the vehicle chamber is not damaged. Therefore, in the vehicle lamp and the swivel lamp unit according to the second embodiment, since the inclined side portion 71 of the heat sink unit 70 can be arranged inside the lamp chamber 2, the radiation effect is excellent in the heat sink unit 70.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle lamp comprising:
    a semiconductor light source that emits a light;
    a heat sink unit on which the semiconductor light source is directly mounted;
    a reflector with an opened upper portion and an opened lower portion that forms a space with an upper opening and a lower opening; and
    a swivel unit that swivels the semiconductor light source and the heat sink unit, wherein
    a swivel shaft that is coupled to the swivel unit is integrated with the heat sink unit,
    the reflector is separately disposed from the heat sink unit, and
    the heat sink unit includes a rear radiation portion which extends rearward from a rear side of the heat sink unit into the space,
    the semiconductor light source is directly mounted on an upper portion of the heat sink unit,
    a shape of the heat sink unit is a turntable rotating around the swivel shaft in a top plane view, and
    the heat sink unit is disposed in a lamp chamber that houses the semiconductor light source.

2. The vehicle lamp according to claim 1, wherein
    a centerline of the swivel shaft is disposed on a substantially vertical plane that includes an optical axis of a reflecting surface that reflects the light from the semiconductor light source in a predetermined direction.

3. The vehicle lamp according to claim 1, wherein
    each of the swivel shaft and a swivel-shaft coupling portion of the swivel unit includes a positioning unit.

4. The vehicle lamp according to claim 1, wherein
    the heat sink unit is integrated with a shade for forming a predetermined light distribution pattern.

5. The vehicle lamp according to claim 1, further comprising:
    an ellipsoidal reflecting surface that reflects the light from the semiconductor light source in a predetermined direction, wherein
    the semiconductor light source is disposed at or near a first focal point of the ellipsoidal reflecting surface, and
    a shade for forming a predetermined light distribution pattern is disposed at or near a second focal point of the ellipsoidal reflecting surface.

6. The vehicle lamp according to claim 1, further comprising a concealing plate for concealing the heat sink unit, wherein
    the semiconductor light source is directly mounted on an upper portion of the heat sink unit,
    a side portion of the heat sink unit is inclined in a spreading manner from top to bottom,
    the concealing plate includes a through-hole in which a portion of the heat sink unit is inserted, and
    an edge of the through-hole is opposed to the side portion of the heat sink unit that is inclined.

7. The vehicle lamp according to claim 1, wherein
    the semiconductor light source is directly mounted on an upper portion of the heat sink unit, and
    a side portion of the heat sink unit is formed in a fin shape.

8. A vehicle lamp comprising:
    a lamp housing and a lamp lens that define a lamp chamber; and
    a swivel lamp unit disposed in the lamp chamber, wherein the swivel lamp unit includes:
        a semiconductor light source that emits a light;
        a heat sink unit on which the semiconductor light source is directly mounted;
        a reflector with an opened upper portion and an opened lower portion that forms a space with an upper opening and a lower opening; and
        a swivel unit that swivels the semiconductor light source and the heat sink unit, wherein
    a swivel shaft that is coupled to the swivel unit is integrated with the heat sink unit,
    the reflector is separately disposed from the heat sink unit, and
    the heat sink unit includes a rear radiation portion which extends rearward from a rear side of the heat sink unit into the space,
    the semiconductor light source is directly mounted on an upper portion of the heat sink unit,
    a shape of the heat sink unit is a turntable rotating around the swivel shaft in a top plane view, and
    the heat sink unit is disposed in a lamp chamber that houses the semiconductor light source.

9. The vehicle lamp according to claim 1, wherein the rear radiation portion includes a fin which is disposed to be substantially parallel to up-down direction of the reflector.

* * * * *